No. 615,106. Patented Nov. 29, 1898.
J. W. SATTERTHWAITE.
BICYCLE ATTACHMENT.
(Application filed Dec. 13, 1897.)
(No Model.)
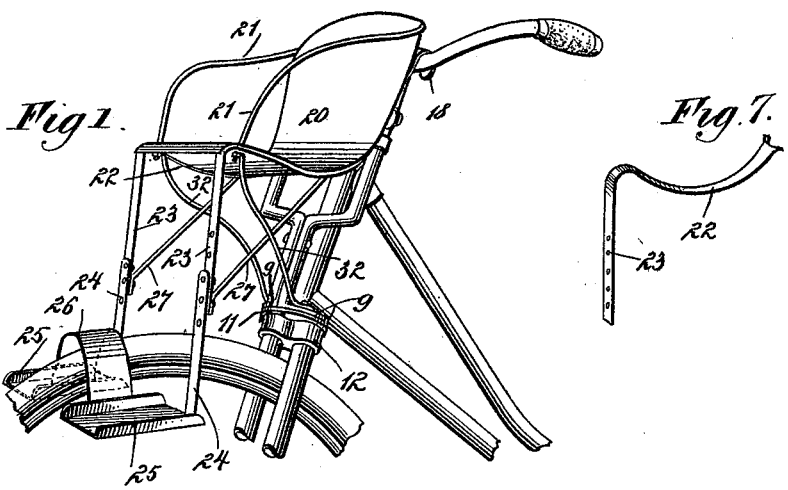

UNITED STATES PATENT OFFICE.

JOSEPH W. SATTERTHWAITE, OF MINGO JUNCTION, OHIO.

BICYCLE ATTACHMENT.

SPECIFICATION forming part of Letters Patent No. 615,106, dated November 29, 1898.

Application filed December 13, 1897. Serial No. 661,738. (No model.)

*To all whom it may concern:*

Be it known that I, JOSEPH W. SATTERTHWAITE, of Mingo Junction, in the county of Jefferson and State of Ohio, have invented a new and Improved Bicycle Attachment, of which the following is a full, clear, and exact description.

This invention is a bicycle attachment by which children may be carried at the front of the bicycle or by which packages may be carried in such position, the invention comprising a frame capable of removable attachment to the bicycle handle-bars and steering-head and carrying a support on which a child or an inanimate load may be placed.

This specification is the disclosure of one form of my invention, while the claims define the actual scope of the invention.

Reference is to be had to the accompanying drawings, forming a part of this specification, in which similar characters of reference indicate corresponding parts in all the views.

Figure 1 is a perspective view of the invention adapted as a child's support. Fig. 2 is a perspective view of the invention adapted as a package-carrier. Fig. 3 is a fragmentary perspective view illustrating the frame of the invention. Fig. 4 is a perspective view of the package-carrier. Fig. 5 is an edge view of a brace for the frame. Fig. 6 is a plan view of a clamp for the frame and steering-fork, and Fig. 7 is a perspective view of one of the braces for the seat-frame.

The bicycle attachment has a frame adapted to be connected with and disconnected from the bicycle, which frame consists of two side bars 7, the lower portions of which are brought into engagement with each other and fastened rigidly to form a stem 8, which terminates at its bottom in two rearwardly-extending spring-fingers 9, adapted to embrace the steering-head of the bicycle just above the fork. Riveted to the lower side of the fingers 9 is a curved plate 10, having its ends 11 bent down to engage the rear side of the steering-fork, whereby the frame is held firmly in place. Fig. 6 shows the plate 10 in detail, and said plate is also indicated by dotted lines in Fig. 3.

The upper ends of the bars 7 are branched outward to form a fork. Telescoping into the upper end of each bar 7 is a pin 13, which pins are held at the desired adjustment relative to the bars 7 by collars 14, such collars serving to compress the upper ends of the bars 7 against the pins 13, for which purposes said upper ends of the bars 7 are slit, as illustrated best in Fig. 3. The pins 13 are held rigidly together by a transversely-extending brace 15, that is shown in Fig. 5, and is provided with eyes 16, respectively embracing said pins. The brace 15 is provided intermediate its ends with a spring-clip 17, which is adapted to engage the steering-head of the bicycle and prevent lateral displacement of the frame. Each pin 13 carries at its upper end a hook 18. The hooks 18 are adjustably connected with the pins by means of set-bolts or equivalent devices 19. The frame is placed in position by engaging the hooks 18 over the handle-bar of the bicycle and by engaging the fingers 9 with the steering-head, so that the ends 11 of the plate 10 will engage the steering-fork. The clip 17 being engaged with the steering-head prevents the frame from moving laterally, and the parts 9 and 18 serve to hold the frame in rigid position.

The frame is adapted to carry either the seat shown in Fig. 1 or the package-carrier shown in Fig. 2. The seat shown in Fig. 1 is formed of a piece of curved sheet material 20, braced by rods 21, serving as arms, and having a brace 22 run beneath each edge and attached to the brace 15 of the frame. The front ends of the braces 22 are extended downward to form legs 23, to which extensions 24 are respectively attached. These extensions 24 carry foot-rests 25, braced by a plate 26, rigidly connected to each and arched over the front wheel of the bicycle. The legs 23 are braced by rods 27, running from the rear ends of the respective braces 22 down to the legs 23. Braces 32 are also run from the outer portion of the seat 20 down to the plate 10. The package-carrier consists of a platform 28, supported by two braces 29. (Shown in perspective in Fig. 4.) The braces 29 extend downward and rearward, respectively, from straps 31 to the plate 11. The straps 31 run along the bottom of the platform 28 and extend up, respectively, at the front and rear edges thereof, so that fastening devices may be attached to the straps to hold the package in place. The straps 31 are constructed of rigid material—such, for example, as sheet-iron. The package is placed on the platform 28 and secured thereto by means of fastening devices run from the straps 31.

Having thus described my invention, I claim as new and desire to secure by Letters Patent—

1. A bicycle attachment having two side bars, the lower portions of which are directly engaged with and fastened to each other, and the upper portions of which diverge from each other so as to lie one on each side of the steering-head of the bicycle, a pin slidably connected with the upper portion of each side bar, a collar carried by the upper portion of each side bar and serving to clamp the pins adjustably in place, a hook carried at the upper end of each pin, the hooks being capable of engaging the handle-bars of the bicycle, two spring-fingers respectively carried by the lower extremities of the side bars and capable of embracing the steering-head directly above the fork of the bicycle, a curved plate secured to the lower sides of the fingers and having downwardly-bent ends capable of engaging the upper end of the steering-fork, braces attached to the curved plate and projecting upwardly and forwardly therefrom, and a support held by the braces and by the side bars and extending forwardly from the side bars.

2. A bicycle-support having two side bars the lower ends of which are joined rigidly to each other and the upper portions of which diverge from each other so as to lie one each side of the steering-head of the bicycle, a pin slidably connected with the upper end of each side bar, a clamping-collar adjustably holding the pins in place, a hook attached to the upper end of each pin, the hooks being capable of engaging with the handle-bars of the bicycle, means at the lower ends of the side bars for engaging the steering-head directly above the steering-fork, braces projecting upwardly and forwardly from said means, and a support held by the braces and by the side bars.

3. A bicycle attachment having two side bars the lower portions of which are engaged with and secured to each other, means at the upper portions of the side bars by which to attach them to the handle-bars of the bicycle, spring-fingers respectively carried by the lower extremities of the side bars and capable of engaging the steering-head of the bicycle, a curved plate attached to the lower faces of the spring-fingers and having downwardly-bent ends adapted to engage with the upper extremities of the steering-fork of the bicycle, and a support carried by the side bars at the front thereof.

JOSEPH W. SATTERTHWAITE.

Witnesses:
W. E. PELLEY,
STEPHEN CLARKE.